(12) United States Patent
Lambert et al.

(10) Patent No.: US 10,420,200 B2
(45) Date of Patent: Sep. 17, 2019

(54) AUTOMATED GAS CUTTING SYSTEM WITH AUXILIARY TORCH

(71) Applicant: Victor Equipment Company, Denton, TX (US)

(72) Inventors: Roger Lambert, West Lebanon, NH (US); David A. Tatham, Enfield, NH (US); Michael Sawchik, Charlestown, NH (US); Douglass A. Demers, Enfield, NH (US); Jake Brandis, Enfield, NH (US); Michael Wolfinger, Newbury, NH (US); Nakhleh Hussary, Grantham, NH (US); Dirk Ott, Canaan, NH (US); Christopher Conway, Wilmot, NH (US); Daniel Barnett, Plainfield, NH (US); Thierry Renault, West Lebanon, NH (US); Kevin Horner-Richardson, West Lebanon, NH (US)

(73) Assignee: Victor Equipment Company, Denton, TX (US)

( * ) Notice: Subject to any disclaimer, the term of this patent is extended or adjusted under 35 U.S.C. 154(b) by 80 days.

(21) Appl. No.: 14/809,359

(22) Filed: Jul. 27, 2015

(65) Prior Publication Data
US 2016/0023295 A1 Jan. 28, 2016

Related U.S. Application Data

(60) Provisional application No. 62/029,837, filed on Jul. 28, 2014.

(51) Int. Cl.
*B23K 10/00* (2006.01)
*H05H 1/44* (2006.01)
*H05H 1/42* (2006.01)

(52) U.S. Cl.
CPC ............ *H05H 1/44* (2013.01); *B23K 10/006* (2013.01); *H05H 1/42* (2013.01)

(58) Field of Classification Search
CPC .. H05H 1/44; H05H 1/34; H05H 1/36; H05H 1/42; B23K 10/006
(Continued)

(56) References Cited

U.S. PATENT DOCUMENTS

| | | | | |
|---|---|---|---|---|
| 3,569,664 A | * | 3/1971 | Newman | B23K 9/1006 219/130.1 |
| 5,296,665 A | * | 3/1994 | Peterson | B23K 9/0673 219/121.54 |

(Continued)

*Primary Examiner* — Mark H Paschall
(74) *Attorney, Agent, or Firm* — Edell, Shapiro & Finnan, LLC

(57) ABSTRACT

An automated plasma cutting system is provided that includes a positioning system mounted to a support, an automated plasma arc torch mounted to the positioning system, and at least one power supply operatively connected to the automated plasma arc torch. The power supply may provide electrical power and fluid flow to the automated plasma arc torch for operation. The system further includes a controller in communication with the automated plasma arc torch and the power supply, and an auxiliary plasma arc torch operatively connected to the power supply, wherein the power supply provides electrical power and fluid flow to both the automated plasma arc torch and the auxiliary plasma arc torch. The automated plasma arc torch may process the workpiece to generate a set of features, while the auxiliary plasma arc torch may process/cut a residual framework of the workpiece remaining after formation of the set of features.

20 Claims, 6 Drawing Sheets

(58) Field of Classification Search
USPC ............ 219/121.39, 121.45, 121.44, 121.48, 219/121.56, 121.46
See application file for complete search history.

(56) References Cited

U.S. PATENT DOCUMENTS

| | | | | |
|---|---|---|---|---|
| 5,624,586 A * | 4/1997 | Sobr | ................. | H05H 1/34 |
| | | | | 219/121.48 |
| 5,866,872 A * | 2/1999 | Lu | ................. | B23K 10/006 |
| | | | | 219/121.54 |
| 5,990,446 A * | 11/1999 | Zhang | ................. | B23K 10/02 |
| | | | | 219/121.45 |
| 6,670,572 B2 * | 12/2003 | Norris | ................. | H05H 1/36 |
| | | | | 219/121.54 |
| 7,071,441 B1 | 7/2006 | Bulle | | |
| 7,091,441 B1 * | 8/2006 | Kuo | ................. | H05H 1/30 |
| | | | | 219/121.36 |
| 7,674,998 B2 | 3/2010 | Ohnishi et al. | | |
| 8,006,403 B2 * | 8/2011 | Anderson | ................. | B23K 9/126 |
| | | | | 33/556 |
| 8,089,024 B2 * | 1/2012 | Forlong | ................. | B23K 7/06 |
| | | | | 219/121.39 |
| 8,278,587 B2 * | 10/2012 | Zhang | ................. | B23K 9/0953 |
| | | | | 219/121.45 |
| 2003/0107160 A1 * | 6/2003 | Bowlin | ................. | B23K 9/324 |
| | | | | 266/48 |
| 2004/0089639 A1 * | 5/2004 | Raymond | ................. | B23K 9/323 |
| | | | | 219/121.48 |
| 2007/0241083 A1 | 10/2007 | Yamaguchi et al. | | |
| 2008/0149602 A1 * | 6/2008 | Lenzner | ................. | B23K 9/1068 |
| | | | | 219/121.45 |
| 2010/0155377 A1 * | 6/2010 | Lindsay | ................. | B23K 31/10 |
| | | | | 219/121.44 |
| 2012/0031881 A1 * | 2/2012 | Griffin | ................. | B23K 10/00 |
| | | | | 219/121.5 |
| 2015/0273618 A1 * | 10/2015 | Harkare | ................. | B23K 10/00 |
| | | | | 219/121.39 |
| 2016/0221108 A1 * | 8/2016 | Hoffa | ................. | B23K 10/006 |
| 2016/0354754 A1 * | 12/2016 | Hirson | ................. | H05H 1/44 |

* cited by examiner

AUTOMATED GAS CUTTING SYSTEM WITH AUXILIARY TORCH

CROSS REFERENCE TO RELATED APPLICATION

The present application is a non-provisional of U.S. Provisional Ser. No. 62/029,837, filed Jul. 28, 2014, the entire contents of which is incorporated herein by reference.

FIELD OF THE DISCLOSURE

The present disclosure relates generally to plasma cutting or welding systems. More particularly, the present disclosure relates to a plasma arc cutting system including an automated plasma arc torch.

BACKGROUND OF THE DISCLOSURE

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Further, the ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

In automated plasma arc torch applications, the plasma arc torch operates at current levels between approximately 10 amps and 1,000 amps or more. At the higher current levels, the torch correspondingly operates at relatively high temperatures. Accordingly, torch components and consumable components must be properly cooled in order to prevent damage or malfunction and to increase the operating life and cutting accuracy of the plasma arc torch. To provide such cooling, high current plasma arc torches are generally water cooled, although additional cooling fluids may be employed, wherein coolant supply and return tubes are provided to cycle the flow of cooling fluid through the torch. Additionally, a variety of cooling and gas passageways are provided throughout various torch components for proper operation of the automated plasma arc torch.

These automated plasma arc torches are typically operated over a workpiece, or multiple workpieces, which are positioned and held onto a receiving table. The automated plasma arc torch processes one or more desired features or patterns from the workpieces on the table. After processing, a residual portion of the workpiece (sometimes referred to as a "skeleton") that does not form a part of the specific geometrical patterns remains on the table and is subsequently discarded prior to another workpiece being positioned for processing.

SUMMARY OF THE DISCLOSURE

Exemplary approaches herein provide an automated plasma cutting system that comprises a support for receiving a work piece, a positioning system mounted to the support, and an automated plasma arc torch mounted to the positioning system. At least one power supply is operatively connected to the automated plasma arc torch, and provides electrical power and fluid flow to the automated plasma arc torch for operation. A controller is in communication with the automated plasma arc torch and the at least one power supply, and an auxiliary plasma arc torch is operatively connected to the power supply. In operation, the power supply provides electrical power and fluid flow to both the automated plasma arc torch and the auxiliary plasma arc torch. The auxiliary plasma arc torch is generally operable to process/cut remaining portions of a work piece upon completion of automated processing/cutting with the automated plasma arc torch.

In one approach, an automated plasma cutting system may include at least one automated plasma arc torch mounted to a positioning system, and at least one power supply operatively connected to the automated plasma arc torch, the at least one power supply providing electrical power and fluid flow to the automated plasma arc torch. The automated plasma cutting system may further include a controller in communication with the automated plasma arc torch and the at least one power supply for operation of the automated plasma arc torch. The automated plasma cutting system further includes at least one auxiliary plasma arc torch operatively connected to the at least one power supply, wherein the at least one power supply provides electrical power and fluid flow to both the automated plasma arc torch and the auxiliary plasma arc torch.

In another approach, a plasma system may include a support for receiving a work piece, a positioning system mounted to the table, and an automated plasma arc torch mounted to the positioning system. The system may further include at least one power supply operatively connected to the automated plasma arc torch, the at least one power supply providing electrical power and fluid flow to the automated plasma arc torch. The system may further include a controller in communication with the automated plasma arc torch and the at least one power supply for operation of the automated plasma arc torch. The plasma system may further include and an auxiliary plasma arc torch operatively connected to the at least one power supply, wherein the at least one power supply provides electrical power and fluid flow to both the automated plasma arc torch and the auxiliary plasma arc torch.

In another approach, a method includes providing electrical power and fluid flow from a power supply to an automated plasma arc torch, and processing a workpiece using the automated plasma arc torch, wherein the automated plasma arc torch is controlled by a controller to process a set of features of the workpiece and to generate a residual framework from the workpiece. The method may further include providing electrical power and fluid flow from the power supply to an auxiliary plasma arc torch for processing the residual framework.

BRIEF DESCRIPTION OF THE DRAWINGS

In order that the disclosure may be well understood, there will now be described various embodiments thereof, given by way of example, reference being made to the accompanying drawings, in which.

Figure 1:
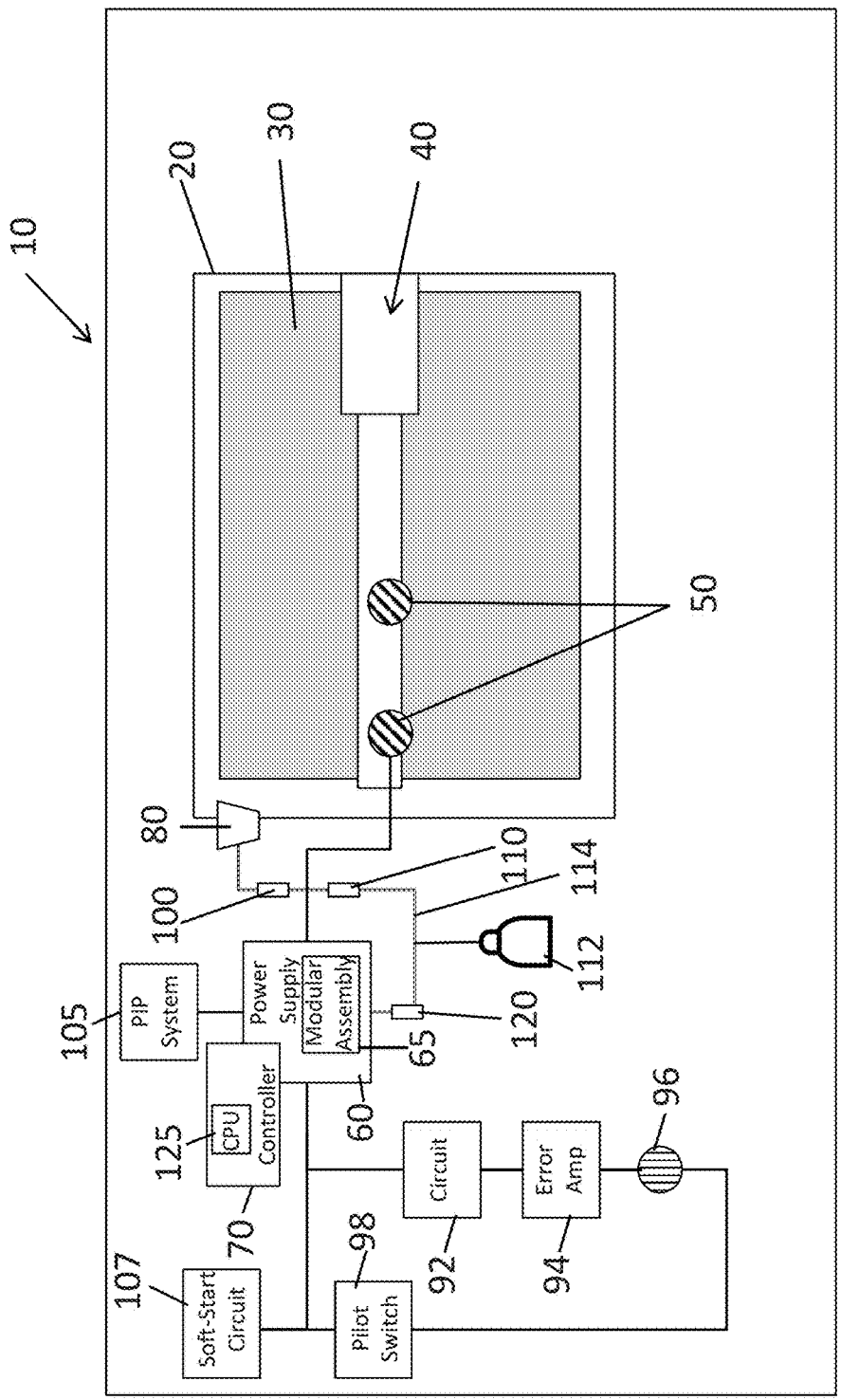
FIG. 1 is a block diagram illustrating various components of an automated plasma arc cutting system according to embodiments of the present disclosure.

The drawings described herein are for illustration purposes only and are not intended to limit the scope of the present disclosure in any way.

DETAILED DESCRIPTION

The present disclosure will now proceed with reference to the accompanying drawings, in which various approaches are shown. It will be appreciated, however, that the disclosed torch handle may be embodied in many different embodiments and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

Figure 2:
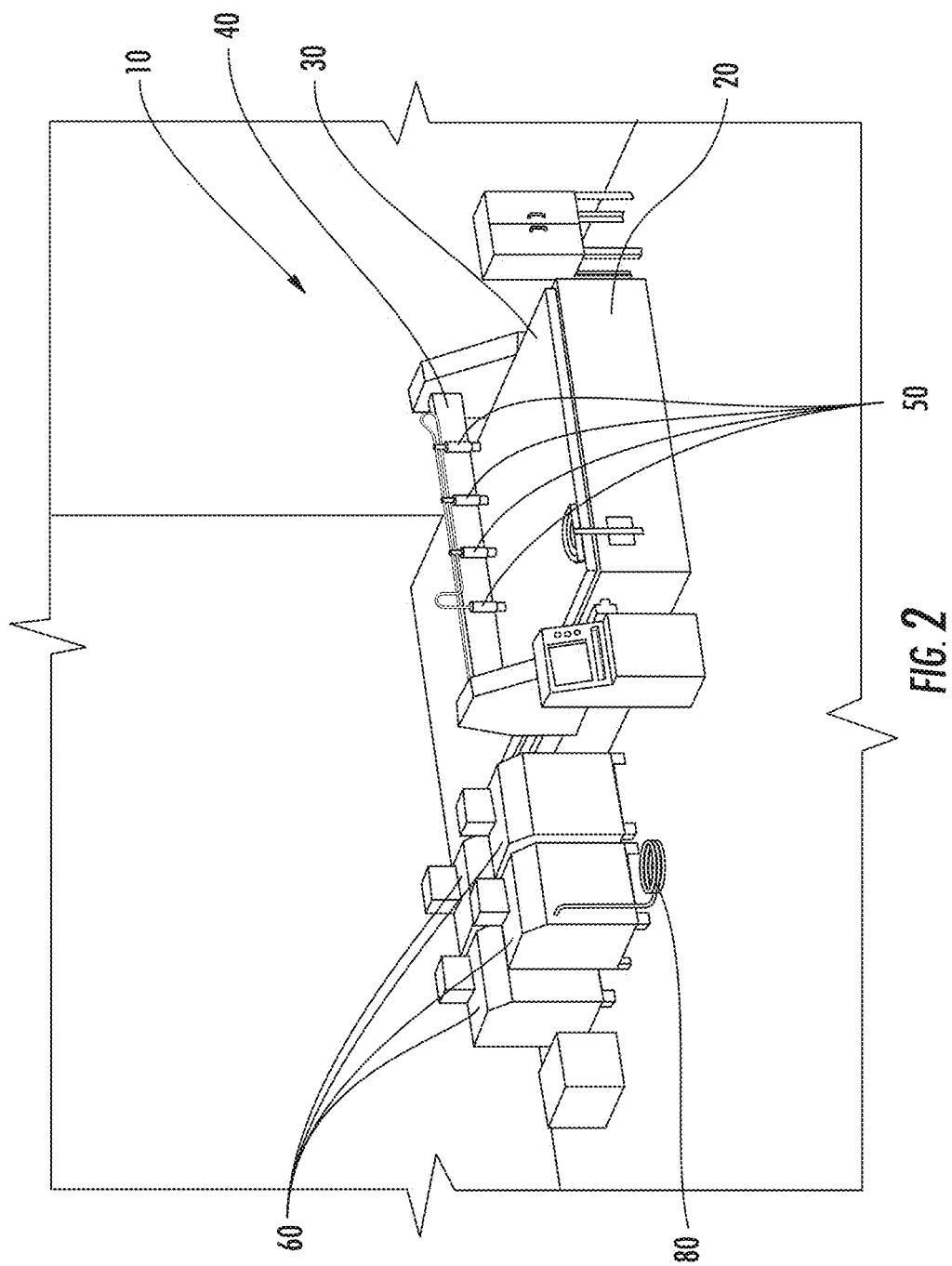
FIG. 2 is a perspective view of an automated plasma arc cutting system according to embodiments of the present disclosure.

Referring now to FIGS. 1 and 2, an automated plasma cutting system according to the teachings of the present disclosure is illustrated and generally indicated by reference numeral 10. As shown, the automated plasma cutting system 10 comprises a table 20 for receiving a workpiece 30, such as a sheet of metal, along with a positioning system 40 mounted to the table 20. At least one automated plasma arc torch 50 is mounted to the positioning system 40 and, in some embodiments, multiple automated plasma arc torches 50 are mounted to the positioning system 40, as more clearly shown in FIG. 2.

As further shown, at least one power supply 60 is operatively connected to the automated plasma arc torch 50, wherein the power supply 60 provides electrical power and fluid flow to the automated plasma arc torch 50 for operation. In another embodiment, a separate fluid supply unit (not shown) or units may be provided rather than providing fluid flow from the power supply 60. As used herein, the term "fluid" shall be construed to include a gas or a liquid.

As further shown, a controller 70 is in communication with the automated plasma arc torch 50 and the power supply 60. In various embodiments, there may exist one controller 70 for a plurality of power supplies 60 and each corresponding automated plasma arc torch 50, or there may exist one controller for each power supply 60.

The automated plasma cutting system 10 may further include an auxiliary plasma arc torch 80 operatively connected to the power supply 60, wherein the power supply 60 may provide electrical power and fluid flow to both the automated plasma arc torch 50 and the auxiliary plasma arc torch 80. In one embodiment, the auxiliary plasma arc torch 80 is a gas plasma arc torch operable with either a high frequency or a low voltage power supply, such that the torch is capable of a high frequency start or a contact start, thereby resulting in a dual mode torch. More specifically, in one embodiment, the auxiliary plasma arc torch 80 may be a dual mode plasma arc torch including an electrode, a tip, and a start cartridge disposed between the electrode and the tip, wherein the start cartridge comprises an initiator in electrical contact with the electrode and in contact with the tip. In another embodiment, the auxiliary plasma arc torch 80 includes an electrode, a tip, and at least one of a contact start cartridge for a contact start mode and a high frequency start cartridge for a high frequency start mode. In yet another embodiment, the auxiliary plasma arc torch 80 represents a contact start plasma arc torch including an additional dielectric standoff, which may be sized such that the contact start plasma arc torch may be operated under high frequency.

In one embodiment, the auxiliary plasma arc torch 80 is configured for manual operation. In another embodiment, the auxiliary plasma arc torch 80 is mounted to the positioning system 40 and is controlled by the controller 70. Furthermore, the auxiliary plasma arc torch may be operable with a single gas source or multiple gas sources.

Additionally, in alternative embodiments of the present disclosure, another cutting or welding device such as an arc welding torch (e.g., SMAW, GMAW), or a gas cutting torch may similarly be provided as an auxiliary device and may be operatively connected to the power supply. Similarly, another automated cutting or welding device such as an arc welding torch (e.g., SMAW, GMAW), or a gas cutting torch may be provided. Accordingly, the automated and auxiliary devices described herein should not be construed as being limited to plasma arc torches and, instead, may be another cutting or welding device, either alone or in combination with plasma arc torches.

As further shown in FIG. 1, the power supply 60 may include a modular assembly 65 having one or more controls, connectors, gas supplies, indicators, electronic circuits and related systems for operating the auxiliary plasma arc 80 torch. In one embodiment, the modular assembly 65 is located within the power supply 60, as shown. In an alternative embodiment, the modular assembly 65 is located external to the power supply 60.

Figure 3:
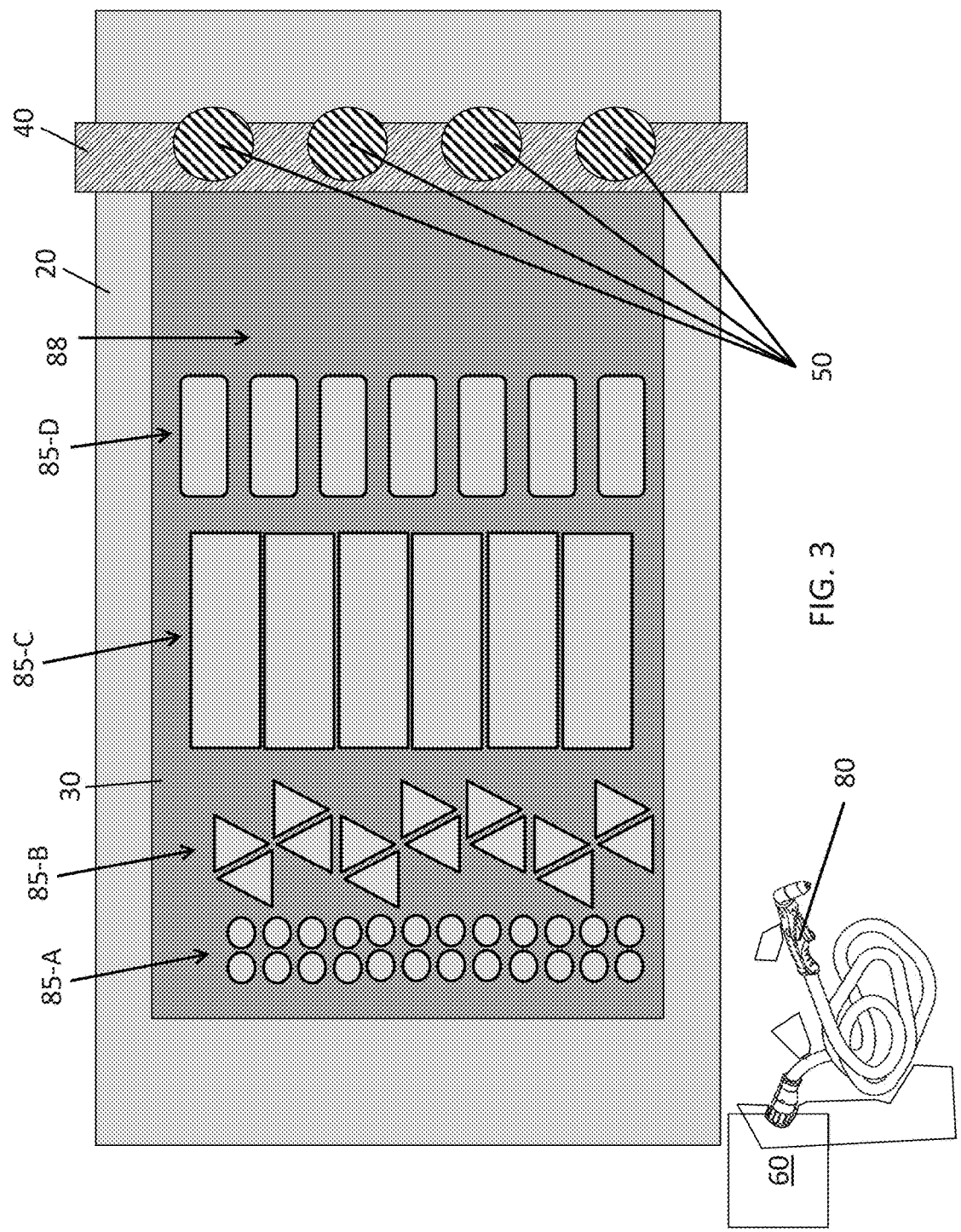
FIG. 3 is a top view of a workpiece after processing according to embodiments of the present disclosure.

With reference now to FIG. 3, processing of the workpiece 30 according to exemplary embodiments will be described in greater detail. As shown, the workpiece 30 may be positioned atop the table 20, where it is processed using one or more automated plasma arc torches 50 to process/generate a set of features 85A-D, which may be parts or cutouts of material from the workpiece 30. Processing by the automated plasma arc torch 50 further generates a residual framework 88 of the workpiece 30. As shown, the residual framework 88 corresponds to those portions of the workpiece 30 remaining following processing (e.g., cutting) of the workpiece 30 to form the set of features 85A-D.

After the workpiece 30 is processed by one or more of the automated plasma arc torches 50, the auxiliary plasma arc torch 80 may process (e.g., cut) the residual framework 88. In one embodiment, electrical power and fluid flow from the power supply 60 is supplied to the auxiliary plasma arc torch 80 for processing the residual framework 88, for example, only after automated processing by the automated arc torches 50 is complete. However, in other embodiments, both the auxiliary plasma arc torch 80 and the automated plasma arc torch 50 can be operated simultaneously. For example, the auxiliary plasma arc torch 80 can be operated at one end of the table 20, while the automated plasma arc torch 50 is operated at another end of the table 20, either on the residual framework 88 or on the workpiece 30. In this case, a separate current regulator may be included in the power supply 60 to facilitate simultaneous power and fluid flow.

In one embodiment, the controller 70 includes one or more fault interlocks to prevent the automated plasma arc torch 50 from operating within a predetermined proximity of the auxiliary plasma arc torch 80 when both are operating simultaneously. These fault interlocks may include, by way of example, proximity sensors that provide a signal to open a contact such that the automated plasma arc torch 50 does not receive power. Additional signals may include voltage and/or current levels, and gas pressure and/or flow rate signals, among others. Furthermore, the controller 70 may be configured to prevent simultaneous operation of both torches in another embodiment of the present disclosure, for example using the interlocks as set forth herein.

It should also be understood that the auxiliary plasma arc torch 80 may be used to process all of the workpiece 30 and, as such, is not limited to only cutting the residual framework 88. For example, the auxiliary plasma arc torch 80 may process the workpiece 30 before the automated plasma arc torch 50 begins operation, or the auxiliary plasma arc torch 80 may be used to rework the set of features 85A-D processed by the automated plasma arc torch 50.

Figure 4:
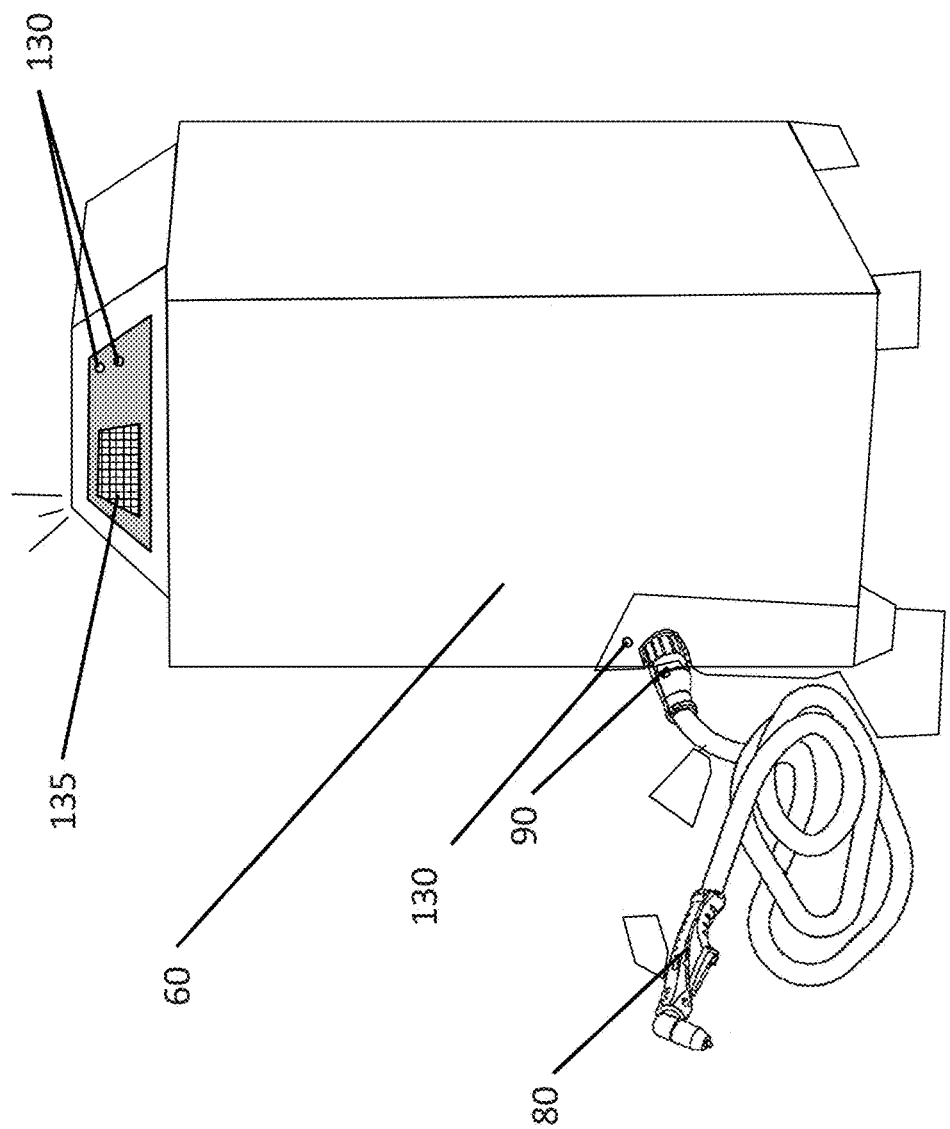
FIG. 4 is an enlarged view of a power supply of the automated plasma arc cutting system of FIG. 1 according to embodiments of the present disclosure.

Referring now to FIG. 4, an exemplary quick-disconnect fitting 90 according to exemplary embodiments is described. As shown, the power supply 60 may include the quick-disconnect fitting 90 for attachment of the auxiliary plasma arc torch 80. The quick-disconnect fitting 90 is configured for use between the power supply 60 and a torch lead in the auxiliary plasma arc torch 80. In exemplary embodiments, the quick-disconnect fitting 90 provides a connection for both fluid flow and electrical power (e.g., a voltage and/or current) between the power supply 60 and the auxiliary plasma arc torch 80, while providing a connection that may be quickly engaged and disengaged in the field.

In one embodiment, the quick disconnect fitting 90 comprises a plug housing secured to a torch lead that engages a socket housing secured to the power supply 60, wherein a locking ring disposed around the plug housing engages the socket housing to secure the plug housing to the socket housing. Alternately, the plug housing may be secured to the power supply 60, and the socket housing may be secured to the torch lead. Further, a plurality of both fluid and electric conductors are disposed within the plug and socket housings, which include but are not limited to, a negative lead gas carrying pin secured within the plug housing, or alternately the socket housing, that engages a main power socket secured within the socket housing, or alternately the plug housing.

In operation, the auxiliary plasma arc torch 80 may be operated in a rapid reattach mode when the power supply 60 is operatively connected to both the automated plasma arc torch 50 and the auxiliary plasma arc torch 80. Rapid reattach generally refers to reattaching the pilot arc before the transferred arc extinguishes. As the remaining residual framework 88 may have a number of discontinuities requiring shorter duration cuts, the arc may stretch beyond the capacity of the power supply 60.

In one embodiment, a rapid reattach is accomplished using an electrode positioned in a circuit path with the power supply 60. The electrode has the output current flowing therethrough, wherein the electrode is adjacent a tip. As shown in FIG. 1, circuit 92 provides a current reference signal having a parameter indicative of the output current, while an error amplifier 94 compares the current reference signal to the sensed current signal and generates an error signal having a parameter indicative of a difference between the current reference signal and the sensed current signal. A rate of change sensor 96 is electrically connected to the error amplifier 94. The rate of change sensor 96 receives the error signal and selectively provides a switch control signal in response to a rate of change in the error signal. A switch circuit (not shown) is responsive to the switch control signal. The switch circuit selectively electrically connects the tip into the circuit path with the power supply 60 and the electrode.

In another embodiment, rapid reattach is accomplished using the circuit 92, which may be a pilot re-attach circuit in which an electrode is positioned in a circuit path with the power supply 60 and has the output current flowing therethrough. The error amplifier 94 generates an error signal in response to a difference between a signal representative of a sensed operating current and a signal representative of a desired operating current. The circuit 92 operates with the rate of change sensor 96 to receive the error signal that is responsive to a time rate of change of the error signal. The rate of change sensor 96 provides a switch control signal having a first state when the time rate of change of the error signal is less than a threshold. The rate of change signal has a second state when the time rate of change of the error signal exceeds the threshold. A pilot switch 98 is responsive to the switch control signal. The pilot switch 98 is operable to electrically connect the tip into the circuit path with the power supply 60 and the electrode when the switch control signal is in the second state.

Additionally, the rapid reattach in one embodiment is implemented partially in hardware and partially in software. For example, the controller 70 may monitor current in a work lead and pilot path. At a prescribed magnitude, the controller 70 will deactivate the pilot switch 98. When rapid decrease in current is detected, the pilot will be reengaged. In one embodiment, a comparator circuit is wired to a CPU interrupt, which functions to reengage the pilot circuit with a reduced delay.

In another embodiment, the auxiliary plasma arc torch 80 is only operable when a Parts-in-Place (PIP) system 105 is activate for both the automated plasma arc torch 50 and the auxiliary plasma arc torch 80. In one embodiment, coolant flow for the power supply 60 is operatively connected to a coolant supply for the automated plasma arc torch 50. The PIP system 105 monitors selected parameters indicative of proper tip and electrode installation in the automated plasma arc torch 50 and the auxiliary plasma arc torch 80. In one embodiment, the tests are completed before the power supply output reaches its final value and, preferably, before it reaches approximately 40 VDC. If the components of either the automated plasma arc torch 50 or the auxiliary plasma arc torch 80 fail to satisfy a parts-in-place test performed by the PIP system 105, power is not delivered to the automated plasma arc torch 50 and/or the auxiliary plasma arc torch 80.

As further shown in FIG. 1, in one embodiment, a soft start circuit 107 is in electrical combination with the power supply 60. The combination of the soft start circuit 107 and the power supply 60 provides a power signal to the electrode that transitions from an initial level to an operating level. A monitor circuit may monitor the electrical relationship between the tip and the electrode. The monitor circuit provides a status signal indicative of the electrical relationship between the tip and the electrode of the automated plasma arc torch 50 and/or the auxiliary plasma arc torch 80. A reset circuit (not shown) is responsive to the status signal. The soft start circuit 107 is then reset so that the power signal returns to the initial level when the status signal indicates an unacceptable electrical relationship between the tip and the electrode of the automated plasma arc torch 50 and/or the auxiliary plasma arc torch 80.

As further shown in FIG. 1, in another embodiment, the soft start circuit 107 supplies a power signal to the electrode (s) via a soft start process in which the power signal transitions from an initial level to an operating level. Specifically, the electrical relationship between the tip and the electrode is monitored, and a status signal indicative of the electrical relationship between the tip and the electrode is provided. A reset circuit is responsive to the status signal. The soft start circuit 107 is then reset so that the power signal returns to the initial level when the status signal indicates an unacceptable electrical relationship between the tip and the electrode of the automated plasma arc torch 50 and/or the auxiliary plasma arc torch 80.

Referring back to FIG. 1, in one embodiment, the auxiliary plasma arc torch 80 is operated with a single gas source 112 for both plasma and shield gas flow. Optionally, an external, in-line filtration system 100 disposed within a gas supply line 114 is employed with the single gas source 112. A gas pressure regulator 110 is also in communication with the single gas source 112, wherein the auxiliary plasma arc torch 80 is only operable above a minimum gas pressure, as provided by the gas pressure regulator 110. Although a gas pressure regulator 110 is shown in this embodiment, a more general gas regulator that regulates pressure and/or flow (e.g., volume or mass flow), such as by way of example, a proportional valve, may also be employed in other embodiments of the present disclosure. With the gas pressure regulator 110, the minimum pressure setting, in a non-limiting embodiment, is 35 psi, with no maximum pressure limit. Accordingly, cutting below 35 psi may be prevented in this embodiment. In other embodiments, the minimum pressure setting may be in a range, depending on the application, from about 25 to about 120 psi. Additionally, the power supply 60 may operate with an electromechanical solenoid 120 to control the gas flow, wherein a post-flow (i.e., after the transferred arc is extinguished) duration is set at 20 seconds in one embodiment of the present disclosure.

Figure 5:
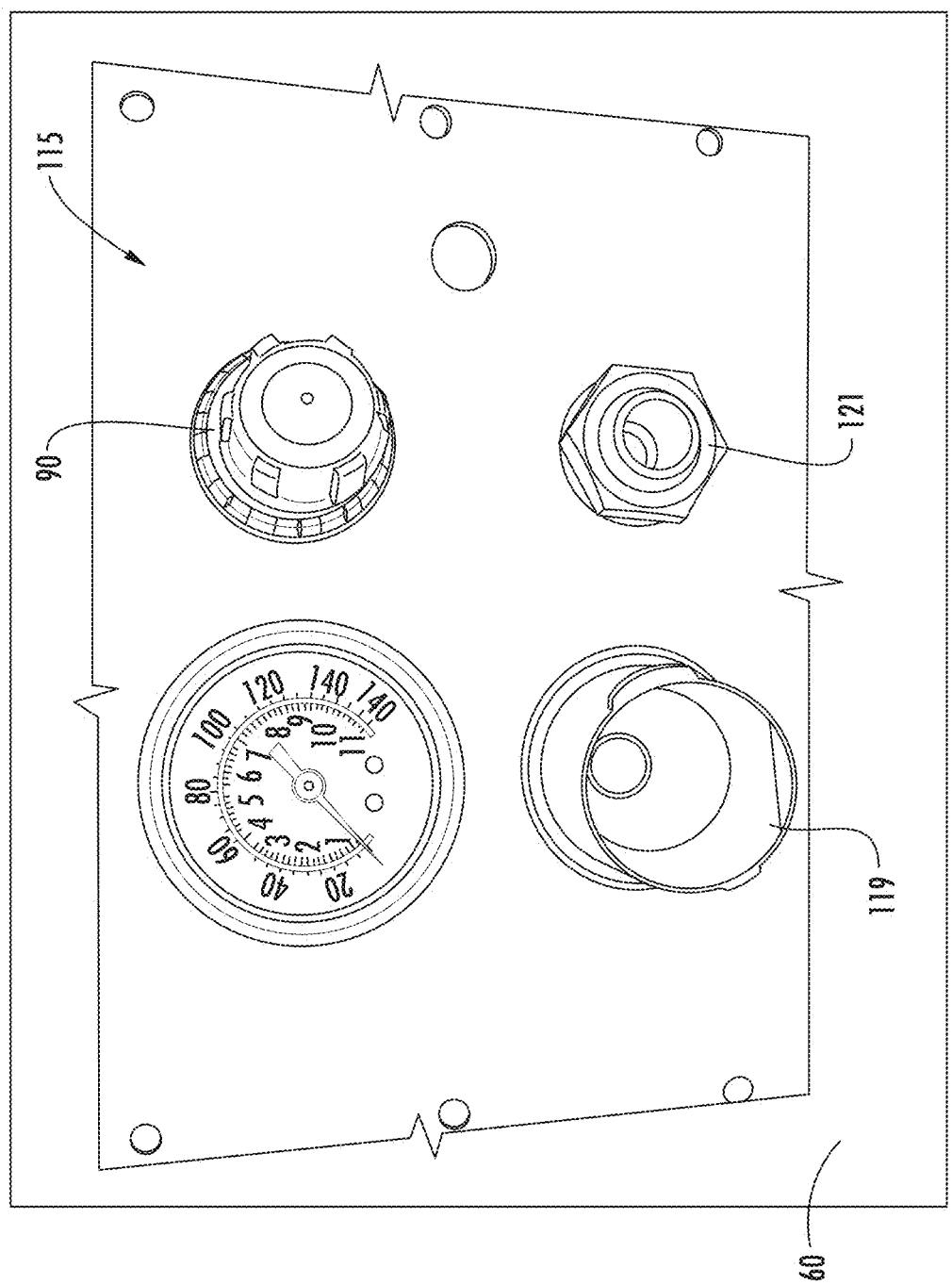
FIG. 5 includes a pictorial representation of an interface module of the power supply of FIG. 4 according to embodiments of the present disclosure.

The auxiliary plasma arc torch 80 in one embodiment includes built-in gas controls, while in another embodiment, the auxiliary plasma arc torch 80 is operated by an automated gas controller. Additionally, as shown in FIG. 5, in one embodiment, the auxiliary plasma arc torch 80 is operable via an interface module 115, which may include components such as the quick-disconnect fitting 90, a power connection 119, and a logic connection 121, among others, wherein the interface module may be inside or outside the power supply 60.

In operation, cutting with the auxiliary plasma arc torch 80 and/or the automated plasma ac torch 50 is governed primarily by a central processing unit (CPU) 125. For example, when an auxiliary plasma arc torch 80 is properly inserted into the power supply 60 via the quick-disconnect fitting 90 and the automated plasma arc torch 50 is not operating, pulling a trigger on the auxiliary plasma arc torch 80 will signal the operator's intent to initiate manual cutting. If previously engaged in automated cutting or inactive since energized, the CPU 125 of the controller 70 may switch from automation to manual control algorithms, with or without any indication.

In another embodiment, a manual switch (not shown) may be provided in order to switch from automation to manual control algorithms. The CPU 125 may initiate a manual cut cycle, which employs an alternate finite state machine to synchronize operation of a contactor, start relay, solenoid, pilot and inverters. For example, during operation, the controller 70 may close the contactor, or a switch, before inverter activation, and prevent the contactor from opening when the inverter is enabled. Gas flow may be commanded after inverter activation to create a plasma arc for cutting in a manual mode using the auxiliary plasma arc torch 80. In one embodiment, a trigger input from the auxiliary plasma arc torch 80 will be ignored by the controller 70 when the automated plasma arc torch 50 is operational.

In another embodiment of the present disclosure, a contactor or switch is provided in order to disconnect a pilot lead of the automated plasma arc torch 50 when coolant remains present and has not yet been purged. This residual coolant may form a conductive path between an electrode and a tip of the automated plasma arc torch 50 after shut-down, and thus the contactor or switch will protect against inadvertent operation or arcing after shut-down.

In one embodiment, the contactor/switch is closed before a preflow stage of each manual cut cycle. The CPU 125 in the controller 70 may force the contactor open to isolate power from the quick-disconnect fitting 90 before the preflow stage of automated cutting. In an exemplary embodiment, such switching is not conducted while current is flowing in the system 10.

The auxiliary plasma arc torch 80 may also be interrupted by the controller 70 upon indication of a fault condition. In various embodiments, the fault conditions may include, by way of example, inverter over-temperature, upper and lower limits and missing phase of an AC input, DC output, a gas pressure lower limit as set forth above, improper AC line voltage, improper DC output voltage, improper inverter output current, improper work lead current, improper, low or high, gas outlet pressure/flow, faulty inverter circuits (e.g., inverter fault codes resulting from faulty capacitor circuits causing voltage imbalance, switching transformer primary over current, defective local bias supply), or low coolant level, among others.

Referring again to FIG. 4, in order to indicate a fault condition to an operator, a variety of fault indicia may be employed in the power supply 60. These may include, by way of example, LEDs 130, messages via a user interface 135, aural signals, and haptic feedback. In another embodiment, the fault indicia is disposed proximate the connector 90 for the auxiliary plasma arc torch 80 on the power supply 60.

Figure 6:
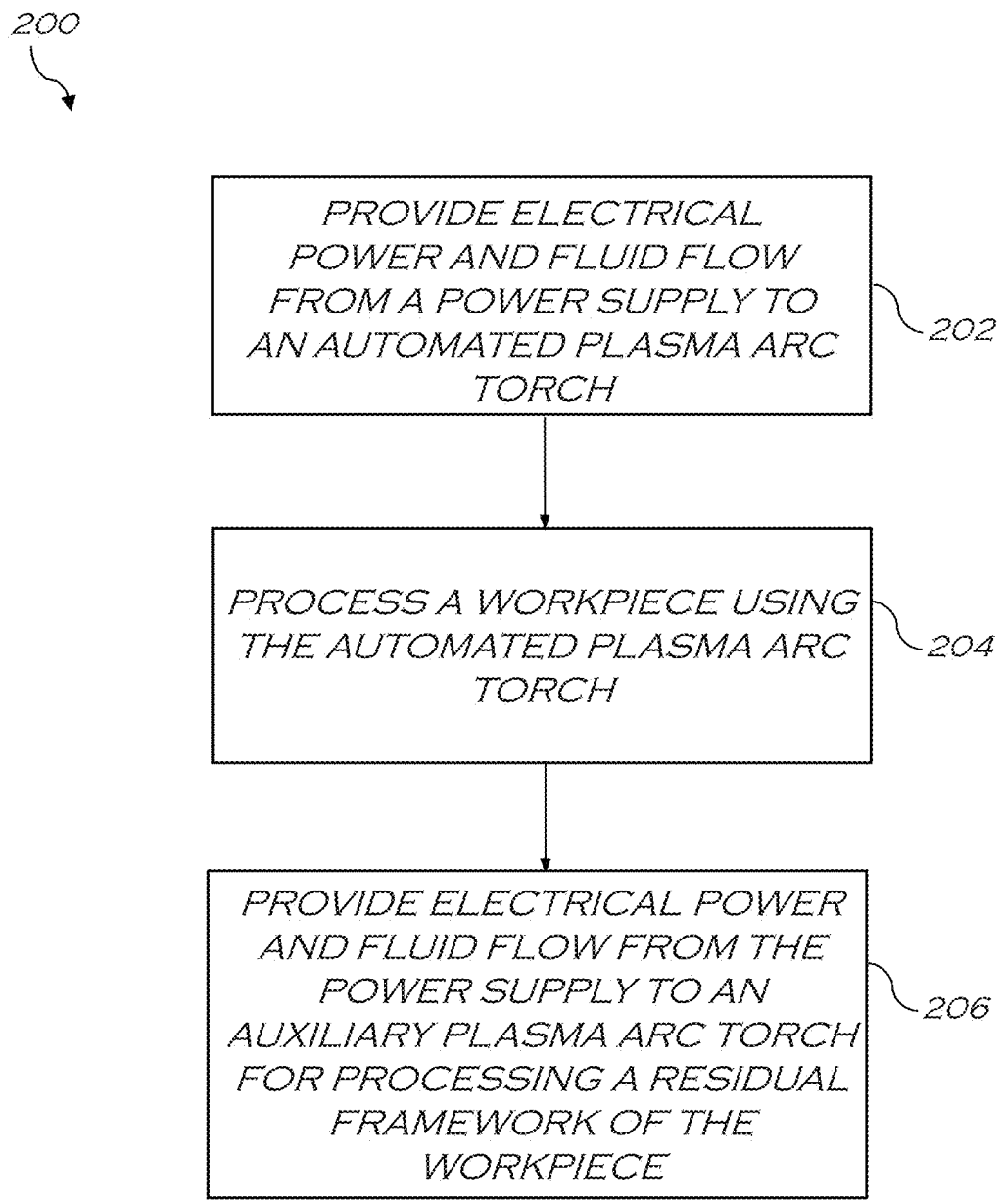
FIG. 6 is a flow chart illustrating methods of operating the automated plasma arc cutting system according to embodiments of the present disclosure.

Referring now to FIG. 6, a method 200 for processing a workpiece according to exemplary embodiments is shown.

The method 200 may include providing electrical power and fluid flow from a power supply to an automated plasma arc torch, as shown in block 202. In some embodiments, at least one power supply is operatively connected to the automated plasma arc torch for providing electrical power and fluid flow to the automated plasma arc torch. In some embodiments, the auxiliary plasma arc torch is operated with a single gas source for both plasma and shield gas flow. In some embodiments, an in-line filtration system disposed within a gas supply line is employed with the single gas source.

The method 200 may further include processing a workpiece using the automated plasma arc torch operatively connected to the power supply, as shown in block 204. In some embodiments, the automated plasma arc torch is controlled by a controller to process a set of features of the workpiece and to generate a residual framework from the workpiece. In some embodiments, the controller is in communication with the automated plasma arc torch and the power supply.

The method 200 may further include providing electrical power and fluid flow from the power supply to an auxiliary plasma arc torch for processing the residual framework, as shown in block 206. In some embodiments, a CPU may initiate a manual cut cycle to process the workpiece using the auxiliary plasma arc torch. In some embodiments, the auxiliary plasma arc torch is a gas plasma arc torch operable with either a high frequency or a low voltage power supply, such that the torch is capable of a high frequency start or a contact start, thereby resulting in a dual mode torch. In some embodiments, the auxiliary plasma arc torch may be a dual mode plasma arc torch. In some embodiments, after the workpiece has been processed by the automated plasma arc torch, the auxiliary plasma arc torch may process the residual framework. In some embodiments, the auxiliary plasma arc torch is operated in a rapid reattach mode, wherein a pilot arc is reattached before a transferred arc extinguishes. In some embodiments, the auxiliary plasma arc torch is prevented from operating while the automated plasma arc torch is operating. In some embodiments, the auxiliary plasma arc torch and the automated plasma arc torch may operate simultaneously.

In view of the foregoing, at least the following advantages are achieved by the embodiments disclosed herein. Firstly, by operating the auxiliary plasma arc torch and the automated plasma arc torch simultaneously, throughput is increased. Specifically, the ability to use a same source to simultaneously operate the auxiliary plasma arc torch to cut the residual framework while the automated plasma arc torch is cutting the set of features improves throughput. Secondly, the auxiliary plasma arc torch can be run in either a manual mode (e.g, in the hands of the operator) or in an automated mode (e.g., on the cutting table).

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

What is claimed is:

1. An automated plasma cutting system comprising:
   an automated plasma arc torch mounted to a positioning system;
   a power supply operatively connected to the automated plasma arc torch;
   a controller in communication with the automated plasma arc torch and the power supply for operation of the positioning system and automatic control of the automated plasma arc torch; and
   an auxiliary plasma arc torch operatively connected to the power supply, wherein the power supply is configured to simultaneously provide electrical power and fluid flow to both the automated plasma arc torch and the auxiliary plasma arc torch, and wherein the auxiliary plasma arc torch is configured for manual operation by a user of the plasma cutting system.

2. The automated plasma cutting system according to claim 1, wherein the power supply includes a quick-disconnect fitting for attachment of the auxiliary plasma arc torch.

3. The automated plasma cutting system according to claim 1, wherein the auxiliary plasma arc torch is operated in a rapid reattach mode in the case that the power supply is operatively connected to the automated plasma arc torch and the auxiliary plasma arc torch.

4. The automated plasma cutting system according to claim 1, wherein the auxiliary plasma arc torch is inoperable unless a parts-in-place (PIP) system is activate for both the automated plasma arc torch and the auxiliary plasma arc torch.

5. The automated plasma cutting system according to claim 1, wherein the auxiliary plasma arc torch is operable with a single gas source, the single gas source providing a plasma flow and a shield gas flow to the auxiliary plasma arc torch.

6. The automated plasma cutting system according to claim 5 further comprising a gas pressure regulator in communication with the single gas source.

7. The automated plasma cutting system according to claim 5, wherein the power supply controls the shield gas flow using one of: an electromechanical solenoid, and a proportional valve.

8. The automated plasma cutting system according to claim 1, wherein the power supply includes at least one indicator of a fault condition.

9. The automated plasma cutting system according to claim 8, wherein operation of the auxiliary plasma arc torch is rendered inoperable by the controller upon recognition of the fault condition.

10. The automated plasma cutting system according to claim 1, wherein the auxiliary plasma arc torch is a dual mode torch operable in either a high frequency mode or a contact start mode.

11. The automated plasma cutting system according to claim 1, further comprising a plurality of automated plasma arc torches.

12. The automated plasma cutting system according to claim 8, wherein the controller includes a fault interlock configured to prevent the automated plasma arc torch from operating within a predetermined proximity of the auxiliary plasma arc torch.

13. A plasma system comprising:
   a support for receiving a work piece;
   a positioning system mounted to the support;
   an automated plasma arc torch mounted to the positioning system;
   a power supply operatively connected to the automated plasma arc torch;
   a controller in communication with the automated plasma arc torch and the power supply for operation of the positioning system and automatic control of the automated plasma arc torch; and an auxiliary plasma arc torch operatively connected to the power supply, wherein the power supply is configured to simultaneously provide electrical power and fluid flow to both the automated plasma arc torch and the auxiliary plasma arc torch, and wherein the auxiliary plasma arc torch is configured for manual operation by a user of the plasma system.

14. The plasma system of claim 13, wherein the power supply is operatively connected to both the automated plasma arc torch and the auxiliary plasma arc torch.

15. The plasma system of claim 13, further comprising a single gas source operable with the auxiliary plasma arc torch, wherein the single gas source provides a plasma flow and a gas flow to the auxiliary plasma arc torch and the automated plasma arc torch.

16. The plasma system of claim 13, wherein the controller includes a fault interlock configured to prevent the automated plasma arc torch from operating within a predetermined proximity of the auxiliary plasma arc torch.

17. A method comprising:

providing electrical power and fluid flow from a power supply to an automated plasma arc torch;

processing a workpiece using the automated plasma arc torch, wherein the automated plasma arc torch is automatically controlled by a controller to process a set of features of the workpiece and to generate a residual framework of the workpiece; and providing electrical power and fluid flow from the power supply to the automated plasma arc torch while simultaneously providing electrical power and fluid flow from the power supply to an auxiliary plasma arc torch to process the residual framework, wherein the auxiliary plasma arc torch is configured for manual operation by a user.

18. The method according to claim 17, further comprising processing the residual framework utilizing the auxiliary plasma arc torch after the automated plasma arc torch has completed processing the set of features of the workpiece.

19. The method according to claim 17, further comprising operating the auxiliary plasma arc torch in a rapid reattach mode by reattaching a pilot arc before a transferred arc extinguishes.

20. The method according to claim 17, wherein the controller includes a fault interlock that prevents the automated plasma arc torch from operating within a predetermined proximity of the auxiliary plasma arc torch.

* * * * *